United States Patent [19]

Briskman

[11] Patent Number: 5,794,138
[45] Date of Patent: Aug. 11, 1998

[54] SATELLITE BROADCAST SYSTEM RECEIVER

[75] Inventor: Robert D. Briskman, Bethesda, Md.

[73] Assignee: CD Radio Inc., Washington, D.C.

[21] Appl. No.: 805,619

[22] Filed: Feb. 26, 1997

[51] Int. Cl.$^6$ .................................................. H04B 1/08
[52] U.S. Cl. ................. 455/344; 455/66; 455/156; 455/349; 343/713; 369/2
[58] Field of Search ....................... 455/344, 345, 455/347, 349, 7, 11.1, 41, 66, 74, 556, 557, 558, 575, 90, 154.1–158.2; 369/1–12; 343/713, 715, 702, 895, 725, 729

[56] References Cited

U.S. PATENT DOCUMENTS

| | | | |
|---|---|---|---|
| 4,742,410 | 5/1988 | Smith | 360/105 |
| 5,048,118 | 9/1991 | Brooks et al. | 455/156 |
| 5,155,494 | 10/1992 | Bryant et al. | 343/713 |

FOREIGN PATENT DOCUMENTS 2098821  11/1982  United Kingdom .

*Primary Examiner*—Nguyen Vo
*Assistant Examiner*—Lee Nguyen
*Attorney, Agent, or Firm*—Bright & Lorig; Patrick F. Bright

[57] ABSTRACT

A radio receiver augmentation system for insertion in a cassette player or compact disc player includes a receiver unit and an antenna unit. The receiver unit includes an insertable element having a size and shape suitable for insertion in a tape cassette receiving slot of a cassette player/radio combination or in a compact disc receiving slot of a compact disc player/radio combination and delivers audio program signals to the magnetic head of the tape cassette player or the optical coupler of the compact disc player. The audio program signals come by retransmission from an antenna unit that receives radio broadcast signals from satellites and their terrestrial repeaters having frequencies in the range of about 300 MHZ to about 4000 MHZ. The system's circuitry conditions the signal for aural presentation through the tape cassette player/radio combination or compact disc player/radio combination.

10 Claims, 4 Drawing Sheets

SATELLITE BROADCAST SYSTEM RECEIVER

BACKGROUND OF THE INVENTION

The use of satellites to broadcast radio programs for reception in automobiles, trucks, vans and other mobile platforms has been widely proposed for implementation (see *Report and Order*, Federal Communications Commission, GEN Docket No. 90-357, Released Jan. 18, 1995). The transmissions from the satellites containing the radio programs are today at frequencies between about 300 MHZ and about 4000 MHZ which are much higher in frequency than those used today for transmission of radio programs such as amplitude modulation (AM) transmission or frequency modulation (FM) transmission. The satellite transmission may be from one or more satellites and from one or more terrestrial repeaters of the satellite transmission in areas where the terrain or man-made structures prohibit good visibility from the automobiles to the satellite(s).

To receive the satellite and terrestrial transmissions in the mobile platforms (i.e., automobiles, trucks, etc.), the mobile platform requires an appropriate radio. Until this relatively new satellite transmission service becomes widely used, which will require several years, automobile manufacturers are unlikely to provide the capability to receive such satellite/repeater transmissions in radios delivered with new cars. This means that potential customers with old cars and with future factory delivered cars desiring such new transmission services must replace their existing radios with new radios which include the capability to receive these transmissions. This is expensive and time consuming, since the removal of the old radio and installation of the new radio must be done by trained technicians at a technical facility. This invention provides a system to add a satellite/terrestrial repeater transmission receiver to existing mobile platform radios quickly and easily by anyone.

The invention is, in part, related to inventions disclosed and claimed in U.S. Pat. No. 5,278,863 which issued on Jan. 11, 1994 and U.S. Pat. No. 5,319,673 which issued on Jun. 7, 1994, both patents entitled "RADIO FREQUENCY BROADCASTING SYSTEMS AND METHODS USING TWO LOW-COST GEOSYNCHRONOUS SATELLITES"; U.S. Pat. No. 5,485,485 which issued on Jan. 16, 1996 entitled "RADIO FREQUENCY BROADCASTING SYSTEMS AND METHODS USING TWO LOW-COST GEOSYNCHRONOUS SATELLITES AND HEMISPHERICAL COVERAGE ANTENNAS"; and U.S. Pat. No. 5,592,471 which issued on Jan. 7, 1997 entitled "MOBILE RADIO RECEIVERS USING TIME DIVERSITY TO AVOID SERVICE OUTAGES IN MULTICHANNEL BROADCAST TRANSMISSION SYSTEMS". The contents of these four patents are incorporated herein by reference as though fully set forth here.

SUMMARY OF THE INVENTION

Satellite systems are being implemented which transmit multichannel radio broadcast programs directly to mobile platforms. Radios in the platforms must be modified or augmented to accept such transmissions. The invention permits the addition of a receiver unit to an existing radio allowing installation to be accomplished by any platform owner or user without special training and without wiring or rewiring of the mobile platform. The receiver augmentation system includes a receiver unit which is inserted in an existing mobile platform radio's tape cassette player or Compact Disk (CD) player slot, and an antenna unit which can be mounted on the platform or can replace an existing cellular antenna.

The receiver augmentation system permits the platform (automobile, truck, RV, boat, light plane, etc.) operator to install additional equipment in the existing platform's radio which allows it to receive transmissions from satellite radio broadcasting systems, typically operating in the radio frequency range of about 300 MHZ to about 4000 MHZ, and preferably in the range of about 800 MHZ to about 4000 MHZ, as well as the normal AM and FM transmissions at lower radio frequencies. The satellite radio broadcasting system's transmissions may come from one or more satellites and/or from one or more terrestrial repeaters of the satellite transmissions. The augmentation system can be installed on any existing platform radio which includes an internal tape cassette or CD player. The installation requires no wiring or rewiring to any vehicle subsystem and can be done by all platform operators without the need for training.

The receiver unit includes an element insertable into the tape cassette slot or the CD slot of an existing platform radio. Extending from the insertable element is a connector, preferably a thin, small cylinder, which extends from the slot and terminates in a display, preferably an LCD display, that shows program data such as channel number, type of music, name of composition, composer, etc. Some of this data may be shown sequentially. A few controls, such as channel selection, may also be mounted on the display. The display's size, distance from slot and orientation are chosen so that access to most controls on the existing radio is unobstructed. The insertable element preferably resembles either a tape cassette or CD. In the tape cassette version, the display portion can be rotated 90° at the connector interface with the insertable element to accommodate both front-loading and side-loading cassette players.

The receiver unit receives satellite system broadcast transmission(s) as a re-transmission from the antenna unit, described below, at a translated frequency via an internal antenna in the frame of the display. Behind the display are one or more electronic chips which amplify, demodulate and control the received signal(s), as well as provide data and electronic drives for the display. Alternatively, some or all of the chips can be mounted on or in the insertable element. One primary output signal from the chips is the audio, either music or voice which, in the cassette case, drives a magnetic coil that couples to an existing magnetic head in the platform's tape cassette player and, in the CD case, drives an optical device that couples to the existing laser reader in the platform's CD player. In both cases, the audio signal then passes through the existing radio's audio amplification subsystem to the existing loudspeakers.

The receiver unit activates when the insertable unit is inserted into the cassette or CD slot as is customary with existing cassette or CD internal players in platform radios. Power for the receiver unit is supplied from internal contact with terminals within the players, from a generator driven by the player spindle or from a plug-in connector to the cigarette lighter.

The antenna unit consists of an element which receives the satellite system's broadcast transmissions, an amplifier, a radio frequency translator and an element which re-radiates the amplified signal to the receiver unit. The antenna unit is preferably mounted on the outer surface of the mobile platform. For a metal car, the mounting is normally made to the outer surface of a window. One configuration would be a silver dollar-sized disk for receiving satellite system transmissions atop a cellular telephone.

rear-window-mounted antenna. Below the disk is a small, cone-shaped electronics housing whose outer surface is also used for the re-transmission antenna. This configuration allows simultaneous cellular telephone operation and satellite broadcast reception without the need for a second mobile platform antenna. Power for the antenna unit is supplied by its internal battery recharged from solar cells or by radiated power from the receiver unit.

The preferred embodiments receive satellite and terrestrial repeater transmissions containing multi-program audio material in vehicles having radios with tape cassette players. As earlier described, the invention is also useful in a wide variety of mobile platforms and with radios having CD players. However, the majority of vehicles, e.g. automobiles, in the United States currently contain radios with tape cassette players.

BRIEF DESCRIPTION OF DRAWINGS

The apparatus and methods of this invention can better be understood by reference to the drawings, in which.

DETAILED DESCRIPTION OF PREFERRED EMBODIMENTS

Figure 1B:
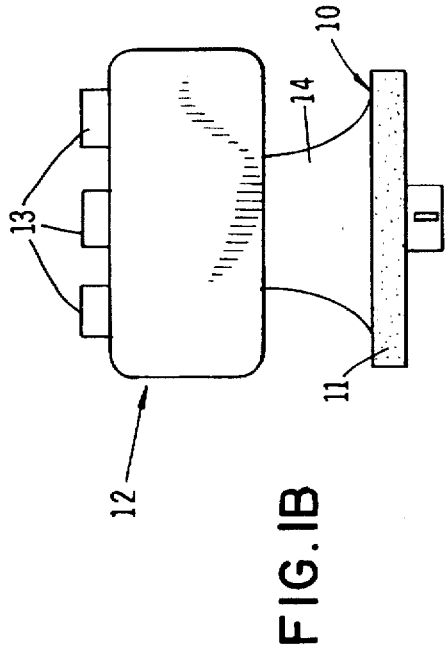
FIG. 1B is a front view schematic diagram of the receiver unit of FIG. 1A.
Figure 1A:
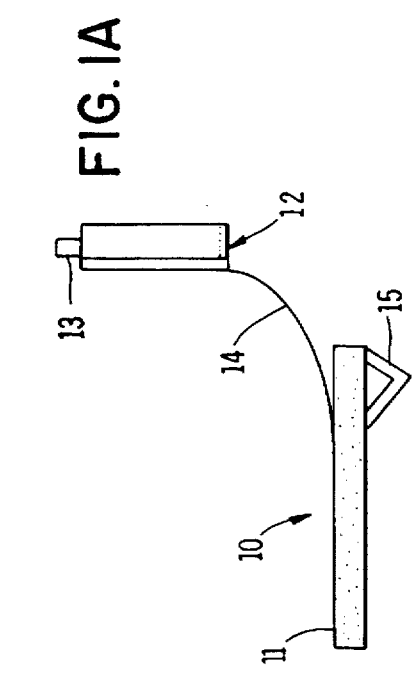
FIG. 1A is a side view schematic diagram of an embodiment of a receiver unit of the invention.

The apparatus comprises two units, a receiver unit and an antenna unit. FIG. 1B shows receiver unit 10. FIGS. 1A and 1B show a physical depiction, FIG. 1A being a side view and FIG. 1B being a front view. The tape cassette or CD insertable element 11 is physically similar to a normal tape cassette or CD except, in the cassette configuration, a magnetic head is emplaced where the tape slot reader is standardly located for electromagnetically coupling the audio output of the receiver unit to the existing radio's magnetic head reader. In the CD configuration, a fiber optics or lucite light bar is located on the bottom of the disk running radially above the track used by the existing radio's laser reader. Also, the cassette configuration can be rotated 90° at a pivot where connector 14 meets insertable element 11. This accommodates tape cassette players whether insertion of the cassette is on the long side or where the insertion of the cassette is on the short side. The front view of receiver unit 10 shows a typical display 12 with three control buttons 13. The size of display 12 is determined by the amount of program information to be displayed and by the need to have good visibility from the driver and front passenger seats. Typically a 10×4 cm LCD display would be used. Controls 13 can be mounted elsewhere on display 12 and can be of many types including pressure sensitive and voice activated. The dimensions of the connector are chosen so the connector and display do not block access to the existing radio controls or to surrounding instrument panel controls.

Also shown is spring-loaded tab 15 at the rear end of the cassette and CD. The tab holds the cassette and CD in the radio player slot after ejection has been performed by exerting mechanical pressure against the cassette or CD outer housing lip. This permits their storage when not in use. The platform operator may depress the tab and fully remove the receiver unit for storage elsewhere in the vehicle.

Figure 2B:
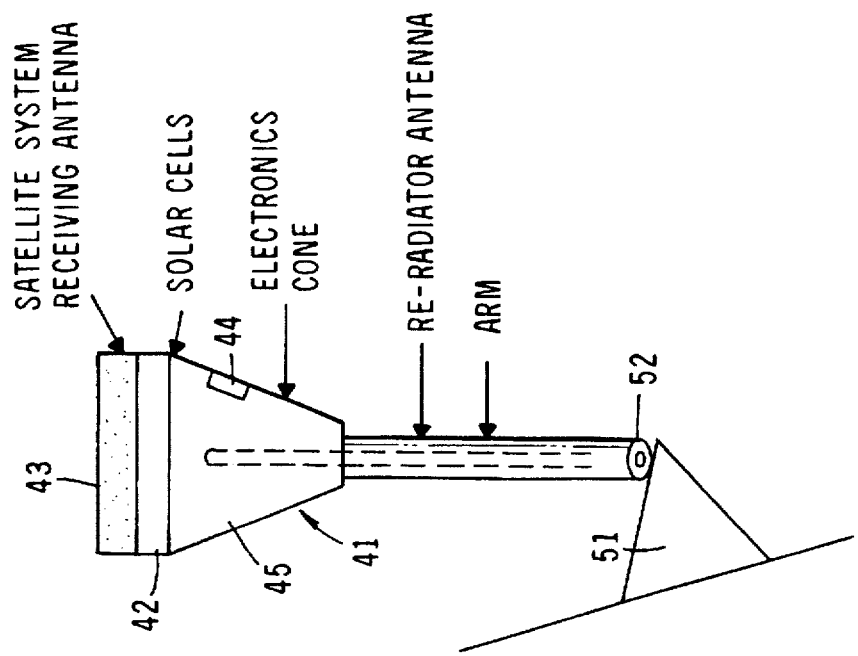
FIG. 2B shows another view of the antenna unit embodiment of FIG. 2A.
Figure 2A:
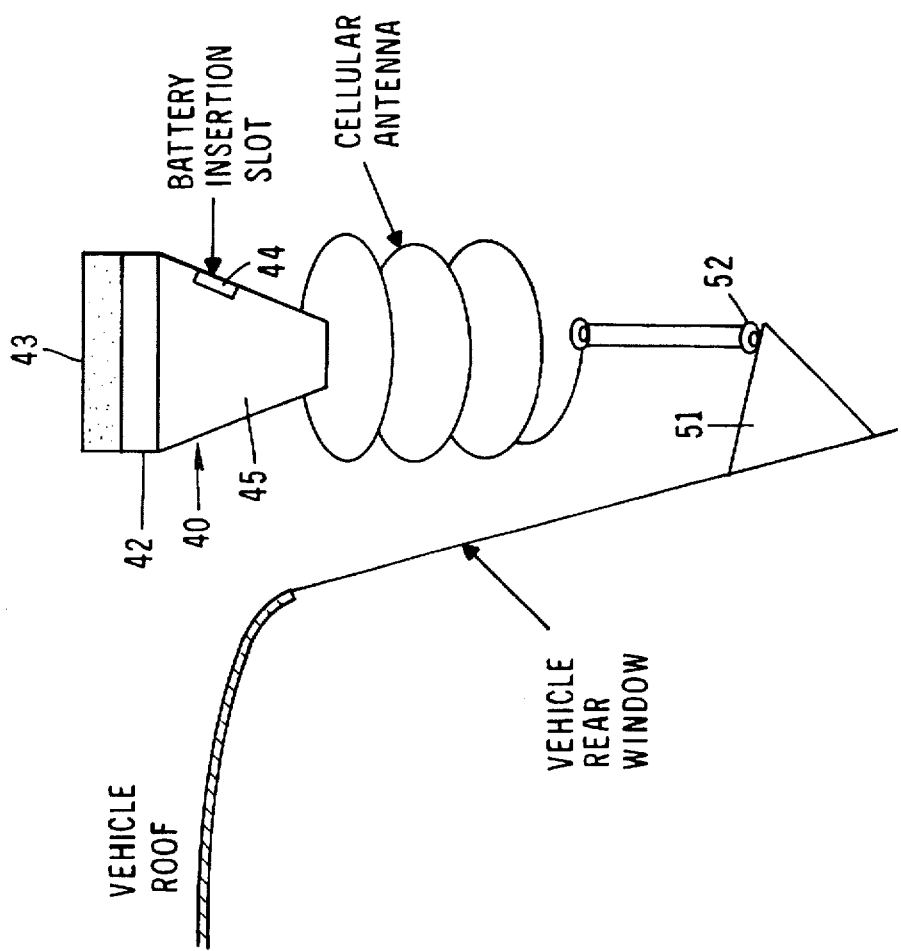
FIG. 2A shows an embodiment of an antenna unit.

In preferred embodiments, the bezel of the display contains a built-in antenna to receive the re-transmission from the antenna unit of FIGS. 2A and 2B. Depending on the frequency chosen for the re-transmission, a loop, bow-tie or loaded dipole antenna may be used. Likewise, if energy is radiated from the insertable unit to power the antenna unit, this energy is also radiated by other elements located in the bezel.

Figure 1C:
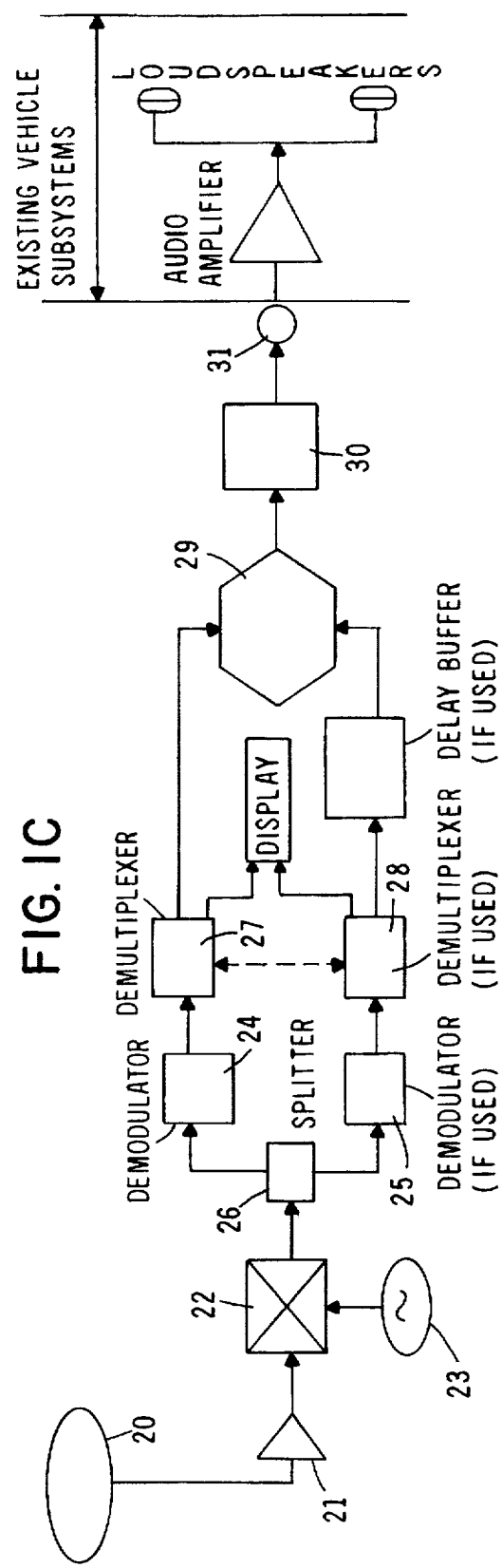
FIG. 1C shows a block function diagram of an embodiment of circuitry for use in the receiver unit shown in FIGS. 1A and 1B.

FIG. 1C shows the electronic configuration of the insertable unit. As previously noted, the antenna is in the bezel of the display, electronics 16 are on integrated circuit chips mounted in the rear of display 12, the magnetic coupler is in the cassette and the optical coupler on the bottom surface of the CD.

FIG. 1C also shows the electronic block diagram where the re-transmission is received by antenna 20, amplified by amplifier 21, and down-converted by converter 22 and associated oscillator 23, if required, to the input frequency of demodulators 24 and 25. As discussed below, the down conversion may be accomplished in the antenna unit. FIG. 1C shows the use of two demodulators following splitter 26 which is typical of satellite radio transmission systems using space, frequency or time diversity. If diversity is not employed, only one demodulator is used. Conversely, more than two demodulators can be used for higher order diversity. It is also feasible to digitize the incoming signal after amplification and then carry out the electronic functions by digital signal processing (DSP).

The output of the demodulators in FIG. 1C are fed to demultiplexers 27 and 28, if several programs have been combined in the signal as normally is the case. The desired program channel is then selected by operator activation of a control. Signal combination at combiner 29 occurs next, typically using a maximal ratio combiner or selection by signal strength, followed by conversion at digital-to-analog converter 30, if the signal is digital, to analog. Finally, the analog program is fed to magnetic coupler 31 in the cassette case or to the optical transmitter (e.g., laser) in the CD case. The magnetic and optical pickups in the existing radio feed the analog program to the existing amplifiers and loudspeakers in the platform. Demultiplexers 27 and 28 also remove the program data (i.e., channel, music type, composer, etc.) from the desired program channel or from an auxiliary service channel and send the data to the display.

FIG. 2 shows, in the top portion, two mounting configurations of antenna units 40 and 41 for automotive vehicles. Numerous mounting configurations are feasible provided that the top portion of the unit has clear visibility of the sky, and the lower portion of the unit has visibility of the receiver unit. FIG. 2A shows a combined cellular telephone and satellite system antenna installation. The right hand configuration shows a stand-alone satellite system antenna installation. In both cases, the only installation required is to glue the antenna unit to the rear window of the vehicle so that the top of the unit is above the vehicle roofline.

Both configurations show a band of solar cells 42 just below the satellite system receiving antenna 43 for use in embodiments where the antenna unit is powered by battery 44 and where solar cells 42 are used to recharge battery 44. Below the solar cell band is a conical housing 45 for the electronics. Elements in the housing surface are used as an antenna to re-radiate the transmissions received from the satellite/terrestrial repeaters to the receiver unit.

Figure 2C:
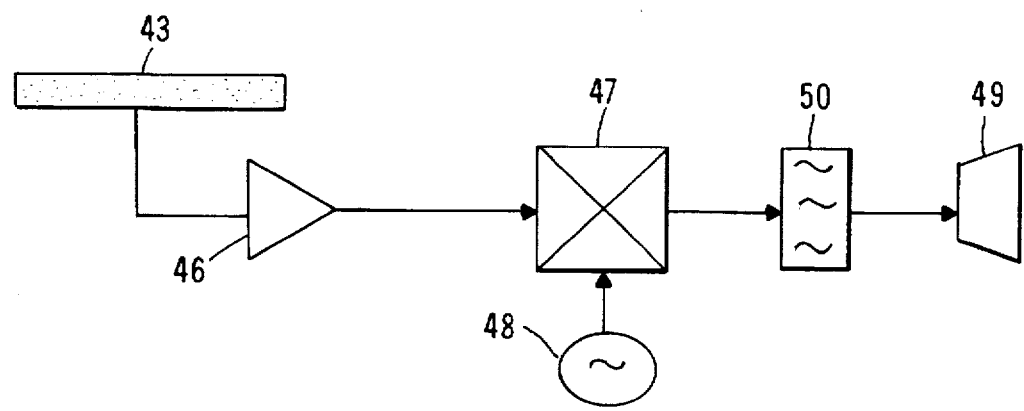
FIG. 2C shows a block function diagram of circuitry for use in the antenna unit embodiment of FIGS. 2A and 2B.

FIG. 2C shows the electronic configuration of the antenna unit. The transmissions from the satellites and terrestrial repeaters are received by satellite system receiving antenna 43 e.g., a patch or planar array circular disk, and applied to radio frequency amplifier 46 followed by frequency converter 47 with associated oscillator 48 which changes the frequency to that chosen for re-radiation from the antenna unit to the receiver unit. The signal is sent to the receiver unit via filter 50 by re-radiator antenna 49 built into the conical electronics housing. The antenna type depends on the frequency chosen for re-radiation. Some useful types are slot, helix, and loaded dipoles.

The antenna unit is preferably mounted on the rear window of an automobile using an adhesive provided with the unit. The adhesive is placed between the outside glass and small plastic mounting plate 51 (see FIGS. 2A and 2B) on the bottom of the antenna unit. Initial bonding is within a minute and final bonding occurs several minutes thereafter. The mounting is such that at least the top of the antenna unit containing the satellite receiving antenna is above the metal roof of the automobile. FIG. 2A and 2B show the antenna unit arm attached to the mounting plate by pivot 52. This allows downward rotation of the antenna unit so it lies against the window during carwashes or allows its removal by pressure on the pivot joint's ears. Alternatively, a fixed mount can be used. Other embodiments noted earlier are the combination of the antenna unit arm with a cellular car antenna which is normally mounted in a similar position on an automobile's rear window.

The user turns on the antenna unit by inserting a battery into the electronics housing cone (see FIGS. 2A and 2B) or by a standard on-off switch if a pre-installed battery is used. The battery is periodically recharged through solar cells mounted near the upper rim of the electronics housing cone. Since the electrical power required by the antenna unit electronics is very small, it is alternatively feasible to radiate energy from the receiver unit to the antenna unit using frequencies such as in the ISM (Industrial, Scientific, Medical) radio frequency bands. The ISM transmission from the receiver unit is received by elements built into the wall of electronics housing cone 45 of the antenna unit, the signal routed to a rectifier and the resulting power used by the antenna unit's amplifier and up/down frequency converter.

The antenna unit receives the transmissions from the satellite(s) and from terrestrial repeaters of the satellite signal. The satellite system receiving antenna shown in FIGS. 2A and 2B is a disk shaped planar array which provides an approximately hemispherical coverage with typically 2–4 dBi of gain throughout the elevation angles of about 20° to about 60° over all azimuth angles. The output of this antenna is connected to a miniaturized microwave monolithic integrated circuit (MMIC) radio amplifier. Such radio amplifiers provide low noise reception (0.3 dB noise figure typically) using a surface area less than 4×8 mm$^2$. The output of the amplifier is sent to a frequency converter which changes the radio frequency of the received satellite/terrestrial repeater transmissions from that used (e.g. about 300–4000 MHZ) preferably about 2332 MHZ, to that frequency desired for use in sending the transmission from the antenna unit to the receiver unit. The radio frequency chosen for sending can be set by the up/down frequency converter to any desired band between approximately 40–4000 MHZ. For the preferred embodiment, 150 MHZ is illustrated since the frequency range 100–500 MHZ often eliminates the need for a frequency converter in the receiver unit. The output power from the frequency converter in the antenna unit is radiated to the receiver unit by elements embedded in the case of the electronics cone and, for longer wavelengths, in the surface of the arm. The wavelength at 150 MHZ is 2 meters and a suitable radiating antenna is a loaded, folded quarter-wave dipole. Assuming the separation of the antenna unit and receiver unit is 4 meters or less, the radiating antenna and receiving antenna each have effective gains of only 3 dBi each (6 dBi total), the obstruction and reflection losses are 8 dB, the receiver unit system total noise temperature is 400° Kelvin and the allowed degradation of the satellite/repeater transmission by re-transmission between the antenna unit and receiver unit is 0.1 dB, the radio frequency power required from the frequency converter in the antenna unit can be calculated as –78.3 dBW (less than a microwatt). Consequently, the electrical power can be supplied by an internal battery for a long time period. This period can be extended by use of a ring of solar cells mounted around the circumference near the top of the antenna unit. The solar cells, when exposed to sunlight, recharge the battery. The antenna unit can also be electrically powered by radiation from the receiver unit as previously described since its electrical power requirements are small.

Figure 3:
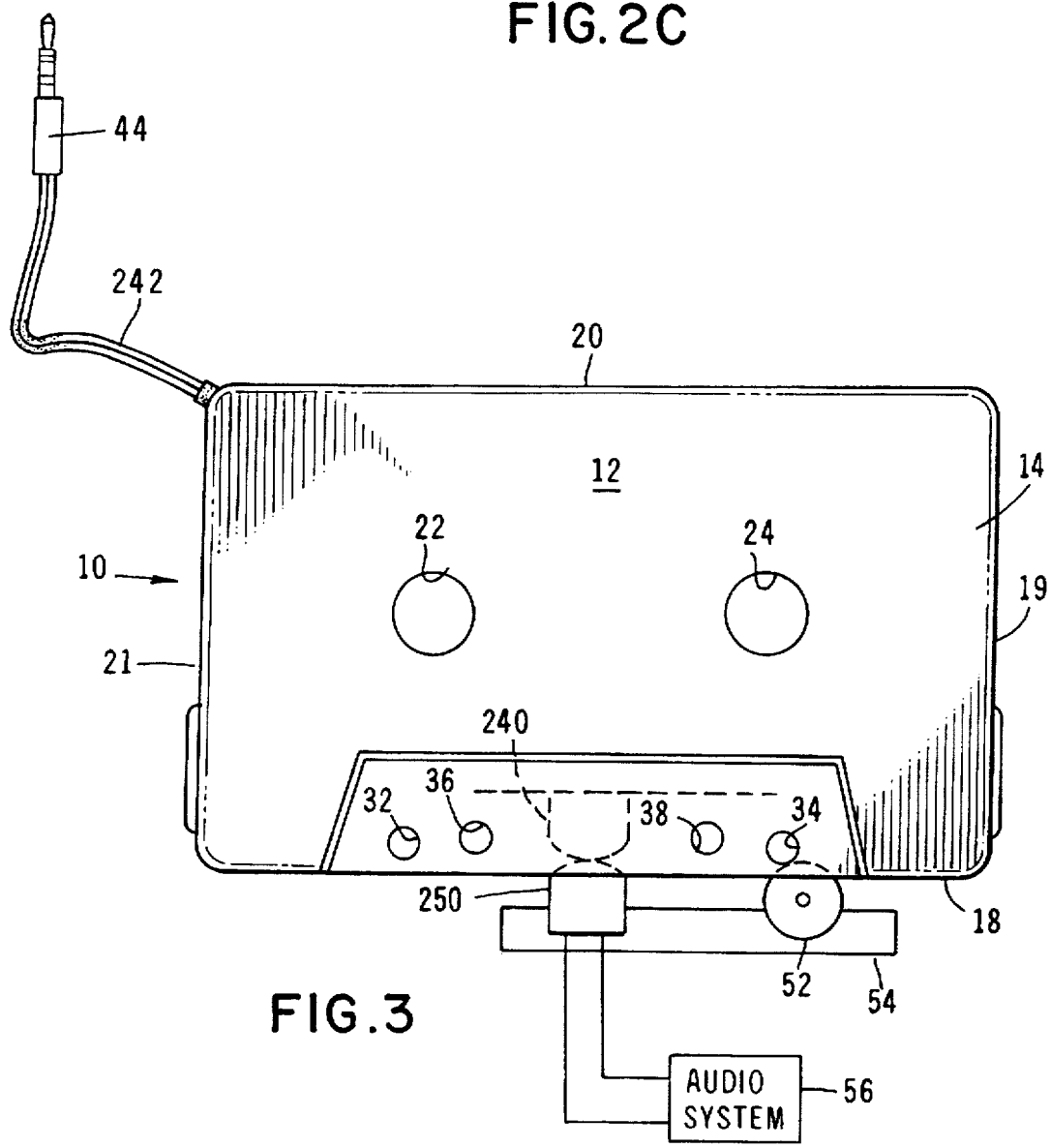
FIG. 3 shows an embodiment of a vehicle radio having a magnetic cassette player, and, in particular, shows the magnetic coupling between an insertable element and the magnetic pick up head of the radio.

FIG. 3 shows a receiver unit with an insertable element suitable for vehicle radios having a magnetic cassette player. Receiver units for a cassette player have been disclosed in U.S. Pat. No. 5,444,675, issued on Aug. 22, 1995, and in U.S. Pat. No. 4,734,897, issued on Mar. 29, 1988. FIG. 3 is from the '897 patent where electrical conductor 242 is incorporated into the connection surface. FIG. 3 also shows magnetic coupling coil 240 in a cassette which couples the audio signal to magnetic pickup head 250 in an existing vehicle radio.

Figure 4A:
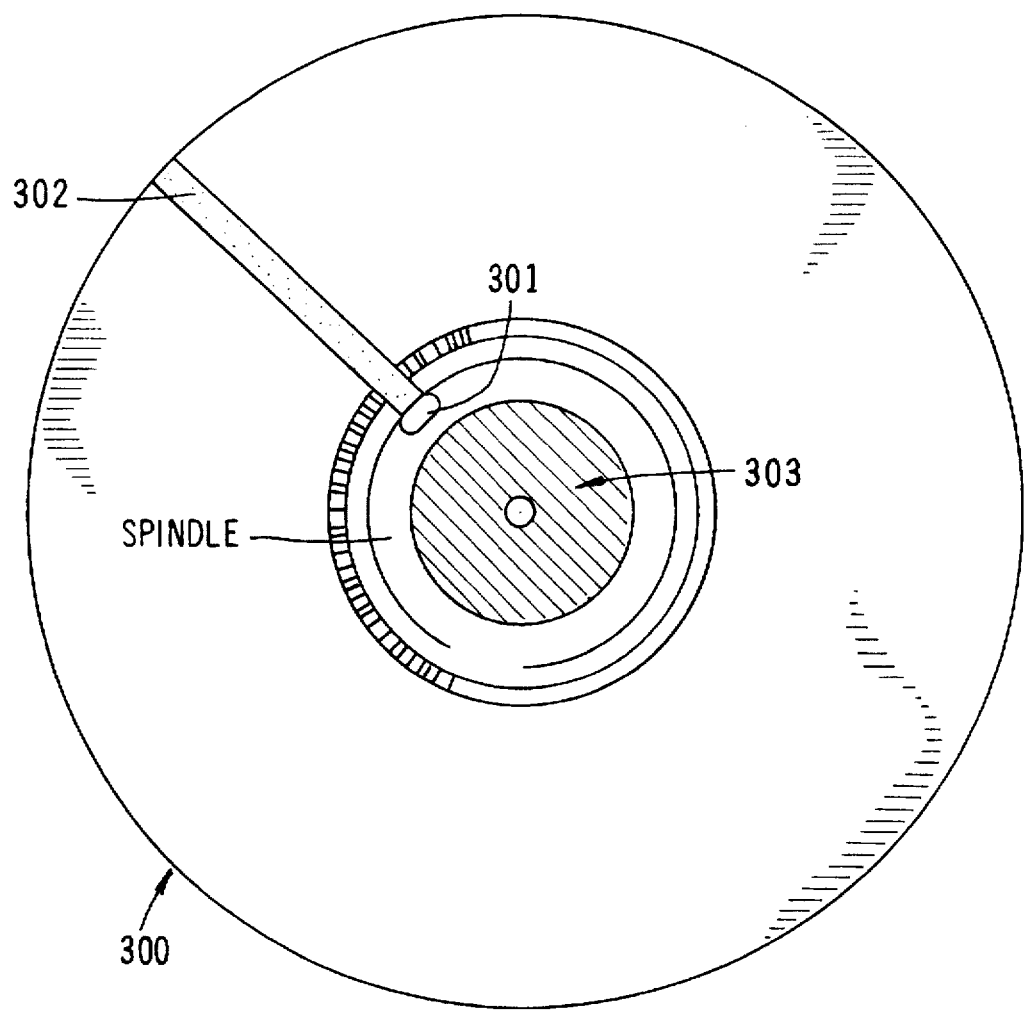
FIG. 4A shows a plan view of an insertable element suitable for use in vehicle radios that include a compact disc player.
Figure 4B:
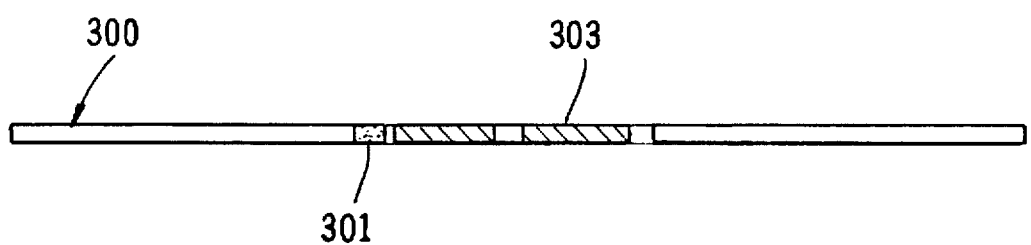
FIG. 4B shows a side elevation of the insertable element shown in FIG. 4A.

FIGS. 4A and 4B show plan and side elevation views, respectively of a receiver unit with insertable element 300 suitable for use in vehicle radios having a CD player. The upper depiction is the bottom of the element showing optical transmitter 301 (e.g. a laser) and radial light bar 302 embedded into the disk's surface. The lower depiction is a side view of the insertable element showing electric generator 303 operating from the CD player spindle. Attachment to the connector and the ejection holding tab are shown in FIG. 1A.

The receiver unit is inserted into the cassette player unit of an existing vehicle radio. The operator first determines whether the vehicle radio has a front or side loading cassette player, and rotates the connector on the insertable element so the display is parallel with the dashboard. The pivot for this rotation has two detents for locking at a desired angular position. Since the insertable element of the receiver unit has the form of a cassette, the insertion of the cassette into the player automatically turns on the power to the radio and activates the player electronics and spindle motor. In the few cassette player radio models where insertion of the cassette does not automatically turn on the power or where the cassette "play" button must first be depressed, the vehicle operator will initially accomplish these functions.

The activation of the receiver unit causes the display to show data on either a pre-programmed audio channel, or on the last channel to which the operator had listened. The display provides the channel number, type of audio and pertinent descriptive information. Simultaneously, the audio program plays through the existing vehicle radio sound subsystem. The operator may use pushbutton controls on the receiver unit display for other functions such as changing the channel to another program.

Electronically, the satellite and terrestrial repeater re-transmissions from the antenna unit at the illustrated 150 MHZ radio frequency are received by the antenna of the receiver unit. The antenna is a modified loop embedded in the bezel of the display, although several other types noted earlier could be used. The antenna feeds the electronics consisting of one to three chips [i.e., these integrated circuits may be combined as may be economically effective using VLSI (Very Large Scale Integration) techniques]. The chips contain a radio frequency amplifier which is fed by the antenna and operates in this case at 150 MHZ. Since, in this embodiment, the frequency translation of the transmissions to the operating frequency of the demodulators (which is 150 MHZ) of the receiver unit was accomplished in the antenna unit, no further frequency translation is required, and the radio frequency amplifier's output is split in half. The resultant signals drive the two demodulators shown in FIG. 1C. The preferred embodiment uses two channel diversity, and the demodulated signals are then sent to the demultiplexers.

The demultiplexers choose the program channel selected by the operator from those channels available. Assuming both space and time diversity are employed, one of the demultiplexer outputs also incorporates a buffer as shown in FIG. 1C to delay one of the received signals by the amount of time diversity designed into the system. The demultiplexer also removes the program information from the program channel selected, such as channel number, program type, performer, etc., and sends these to the display. Alternatively, these data can be provided by a service channel devoted to such information. The outputs of the demultiplexers are brought into phase with each other by automatic adjustment of either short timing buffers, when interleaving is used, or long timing buffers when time diversity is employed. The outputs are then summed using a maximal ratio combiner or, alternatively, the stronger signal is selected. Though transmissions are digital in preferred embodiments, analog transmission is feasible. If digital, the program channel output from the combiner/selector is fed to a digital-to-analog converter.

The analog signal is amplified and sent from the back of the display, through the connector surface, to the insertable element cassette where it drives a magnetic coil located where normally is located the magnetic tape slot opposite the magnetic pickup head in the cassette player of the vehicle radio. The magnetic coil is configured in drive and frequency emphasis so that the resultant audio signal produced by the pickup head is of high fidelity. The magnetic pickup head feeds the existing audio amplifiers and loudspeakers in the vehicle's radio system so that the operator hears the selected program.

The operator is required in many vehicle tape cassette players to eject the receiver unit when AM/FM radio reception is desired. This is done by pressing the ejection button on the existing radio. The receiver unit does not fully leave the cassette player slot since a spring-loaded tab presses against the edge of the slot lip. Full ejection, if desired for reasons such as storage, is accomplished by the operator depressing the tab and fully withdrawing the receiver unit.

The preferred embodiment electrically powers the receiver unit by running a miniature generator located in the insertable element driven by the rotation of the existing cassette spindle. This can be accomplished by direct or geared drive between the spindle and generator armature or by belt or chain drive between them. A battery is also included, so that the receiver unit can instantly commence operation, and the battery is recharged by the generator.

What is claimed is:

1. A radio receiver augmentation system for insertion in a cassette player or compact disc player comprises a receiver unit including an insertable element having a size and shape suitable for insertion in a tape cassette-receiving slot of a cassette player or a compact disc-receiving slot of a compact disc ("CD") player, and an antenna unit having a size and shape adapted for mounting on a vehicle, said antenna unit comprising an antenna that can receive audio program signals having frequencies in the range of about 300 MHZ to about 4,000 MHZ from a satellite system including at least one repeater at or near the earth's surface, and can re-radiate said signals to said receiver unit, said antenna unit comprising a first element which receives, from said satellite system, radio broadcast signals having frequencies in said range, and connected to said first element, an amplifier, a radio frequency translator, a radio frequency transmitter, and a second element which transmits amplified translated signals to said receiver unit, said insertable element including a connector, a display unit for audio program signals, an antenna for receiving audio program signals from said antenna unit, and a coupler that can deliver said audio program signals to a magnetic head in a tape cassette player, or to an optical coupler in said CD player.

2. The system of claim 1 wherein the top of said antenna unit has the size and shape of a flat disc for receiving said audio program signals from at least one satellite, said at least one repeater, or both.

3. The system of claim 1 wherein said antenna unit includes a mounting plate, an arm that houses a re-radiator antenna, an electronics cone connected to said arm, and, connected to said electronics cone, solar cells and a satellite system receiving antenna.

4. The system of claim 1 wherein said receiver unit comprises a receiving antenna in said display unit, and said insertable element includes a magnetic or optical coupler for delivering said audio program signals to a speaker system.

5. The system of claim 1 wherein said receiver unit comprises a tape cassette player/radio combination, and said insertable element has the size and shape of a tape cassette, said insertable element including a magnetic coupler for delivering audio program signals to said magnetic head of said tape cassette player.

6. The system of claim 1 wherein said receiver unit is a radio/compact disc player combination, and said insertable element comprises a CD-shaped disc having a light-transmitting region on its surface, and where said CD player/radio combination includes an optical coupler for receiving audio program signals in optical form from said insertable element.

7. The system of claim 1 or claim 5 or claim 6 wherein said receiver unit includes an electrical generator in said insertable element, operatively connected to a cassette spindle or CD player spindle.

8. The system of claim 7 wherein said receiver unit includes at least one rechargeable battery.

9. The system of claim 1 wherein said receiver unit radiates electrical energy to said antenna unit.

10. The system of claim 9 wherein said receiver unit includes at least one rechargeable battery.

* * * * *